No. 860,929. PATENTED JULY 23, 1907.
L. C. & I. S. MERRELL & W. B. GERE.
PROCESS OF SEPARATING THE MOISTURE FROM THE CONSTITUENT SOLIDS OF LIQUIDS.
APPLICATION FILED AUG. 29, 1906.
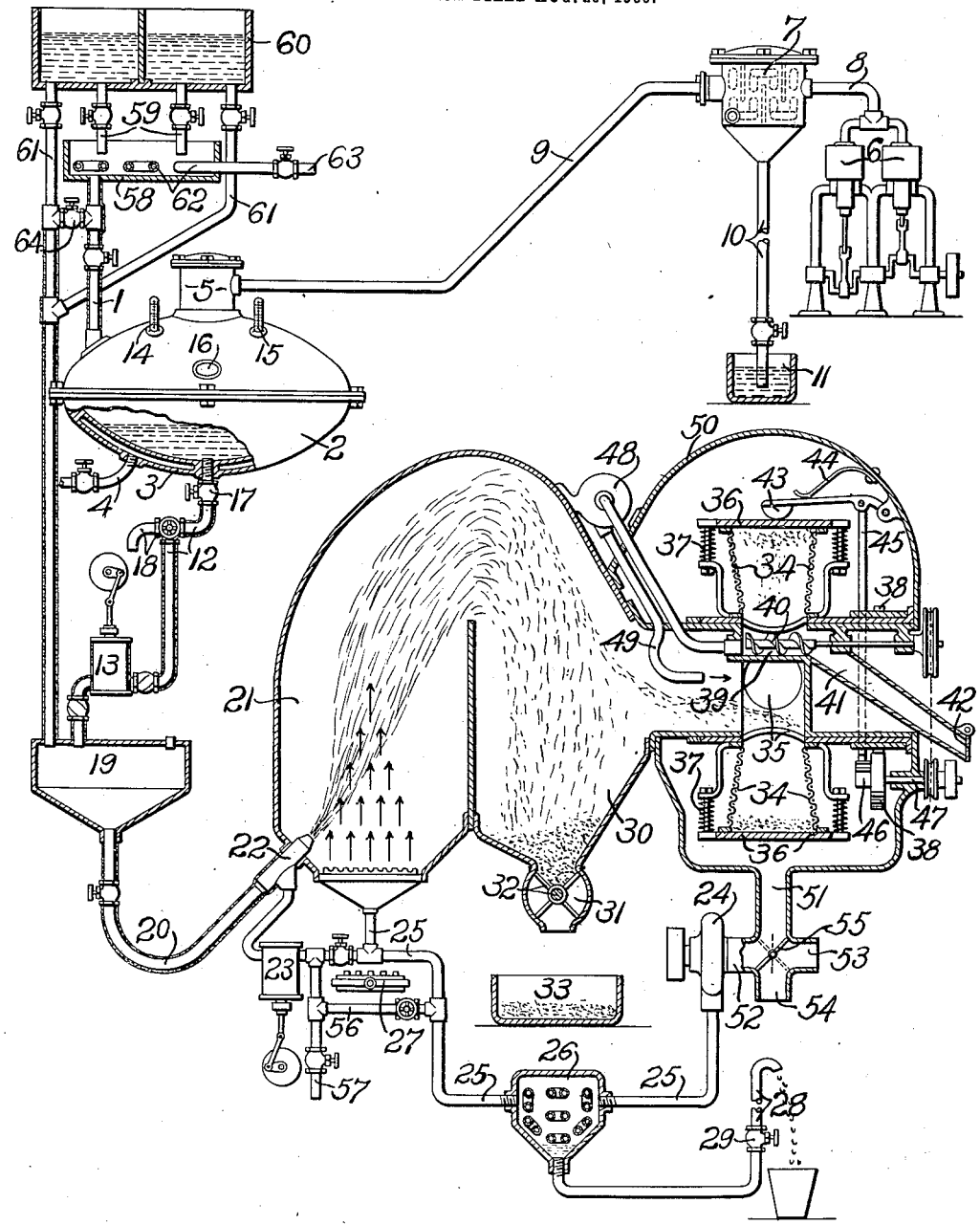
WITNESSES:
A. C. Thomas
U. M. Nott
INVENTORS
L. C. Merrell
I. S. Merrell and
W. B. Gere
BY Howard P. Denison
ATTORNEY

UNITED STATES PATENT OFFICE.

LEWIS C. MERRELL, IRVING S. MERRELL, AND WILLIAM B. GERE, OF SYRACUSE, NEW YORK, ASSIGNORS TO MERRELL-SOULE COMPANY, OF SYRACUSE, NEW YORK, A CORPORATION OF NEW YORK.

PROCESS OF SEPARATING THE MOISTURE FROM THE CONSTITUENT SOLIDS OF LIQUIDS.

No. 860,929.　　　Specification of Letters Patent.　　　Patented July 23, 1907.

Application filed August 29, 1906. Serial No. 332,515.

*To all whom it may concern:*

Be it known that we, LEWIS C. MERRELL, IRVING S. MERRELL, and WILLIAM B. GERE, all of Syracuse, in the county of Onondaga, in the State of New York, have jointly invented new and useful Improvements in Processes of Separating the Moisture from the Constituent Solids of Liquids, of which the following, taken in connection with the accompanying drawings, is a full, clear, and exact description.
This invention relates to process for separating the moisture from the constituent solids of liquids, and semi-liquids, and recovering such solids in the form of a substantially dry powder, which may, by the addition of suitable moisture, be reconstituted into a liquid or semi-liquid possessing all of the characteristics of the original liquid or semi-liquid: and contemplates the commercial pulverization of animal, vegetable, including broadly, juices, pulps, extractives, and highly organized substances, such as milk, eggs, medicaments, and substances containing ferments, living cells, or active organisms, as yeast, diastase and pepsin; and any other liquid or semi-liquid, the solids of which it is desirable to reduce to dryness without changing their physical or chemical structure.
The drawing represents a vertical section, partly in elevation, of the apparatus designed to carry out this process.

The material to be treated is supplied through a valved pipe 1, preferably heat-insulated, to a concentrating chamber 2, having a heating chamber 3, for receiving a heating agent, as steam, through a valved pipe 4. A minus pressure is maintained in the dome, as 5, of the concentrating chamber by means of one or more pumps 6, aided by a condenser 7, which is connected to the pumps by a pipe 8, and to the dome by a pipe 9. The condenser 7, is, in this instance, provided with a pendent pipe 10, of sufficient length so that the condensed water therein is capable of substantially counterbalancing atmospheric pressure to maintain a predetermined degree of minus pressure in the dome of the concentrating chamber, irrespective of the pumps, the excess condensed water being allowed to escape through a water-seal 11, at the lower end of the pipe 10. The minus pressure must be sufficient to cause ebullition and consequent separation and removal of moisture from the liquid at a predetermined temperature at which the liquid is to be concentrated. This temperature varies according to the nature of the material, as for example, certain albuminous liquids must be concentrated at a temperature of 138° F., or less, to prevent coagulation. The liquid is constantly supplied to the concentrating chamber 2, and the moisture-vapor, produced by the ebullition, caused by the heating agent in conjunction with the minus pressure, is con-
tinuously drawn into the condensing chamber 7, and discharged, as water, through the water-seal 11, or through the pumps 6, as may be desired. The liquid, freed from part of its moisture, is continuously withdrawn from the bottom of the concentrating chamber 2, through a pipe 12, by a pump 13, the ebullition serving to thoroughly mix the inflowing liquid with that already in the concentrating chamber so that the outflowing liquid is of uniformly reduced moisture-content.

The concentrating chamber 2, has a pressure-gage 14, and a thermometer 15, to enable the attendant to maintain ebullition and regulate the temperature to avoid impairment of the solubility, color, flavor and other natural characteristics of the solids which it may be desired to preserve. The concentrating chamber 2, is also provided with a sight-glass 16, to enable the attendant to observe the ebullition and maintain a uniform quantity of liquid within, by regulating the inflow and outflow, thereby producing a practically uniform reduction in the moisture-content of the outflowing liquid. The outlet of the concentrating chamber 2, is provided with a suitable regulating valve 17, and a two-way draw-off cock 18, the latter serving, in conjunction with valve 17, to permit samples of the outflowing liquid to be withdrawn, from time to time, for examination.

The discharge pipe 12, pump 13, and appurtenances are preferably heat-insulated and deliver the liquid into a reservoir 19, preferably heat-insulated, thereby conserving the heat and enabling the introduction of the liquid, through pipes 20, preferably heat-insulated, into a desiccating chamber 21, as nearly as possible at the predetermined temperature of the liquid in the concentrating chamber 2.

At the introduction of the liquid into the desiccating chamber it is subdivided into minute particles, by forcing it through one or more spraying devices 22, preferably by means of a pressure device, as a pump 23, but it may be introduced by gravity from the reservoir 19. The minute particles are caused simultaneously to commingle with a desiccating agent, as dry air or a gas, which is forced by a pressure device, as the pump 24, through the conduit 25, into the desiccating chamber, intersecting the path of the inflowing liquid spray, the intense evaporation, produced thereby upon the spherical surface of the particles, causing a cooling effect upon their solids. The air, either before or after entering the pump 24, is preferably passed through a drying chamber 26, in this instance, supplied with a cooling medium by means of which part of the moisture of the air may be precipitated by condensation, and the air is then heated and expanded by a heater 27, thereby materially increasing its desiccating power avidity for moisture previous to its introduction into the desiccating chamber.

The drying chamber 26, is provided with a standpipe 28, having a valve 29, which is closed, upon the initial introduction of air into the drying chamber, to prevent the escape of the air to atmosphere through the stand-pipe 28, and opened as soon as sufficient water has collected in the drying chamber to fill the stand-pipe, which is tall enough to hold a column of water capable of substantially counterbalancing the air pressure within the drying chamber, whereupon the excess of water is free to drip continuously from the open end of the stand-pipe.

Part of the dry powder resulting from desiccation may gravitate into a receptacle 30, having an outlet 31, provided with a rotary gate 32, which may be operated manually, or by any available power to automatically discharge the dry product into a receptacle 33, while the moisture-laden air is passed through an air-pervious screen, as bolting-cloth, which practically confines within certain limits the balance of the dry solids so that they may be collected and removed automatically, or at the will of the attendant. These solids may be separated from the moisture-laden air in a rotary dust-collector, consisting of, in this instance, four tubular screen-partitions 34, communicating through openings 35, with the interior of the desiccating chamber, each tubular screen having its outer end closed by a head 36, which is movable radially against the action of springs 37. This dust-collector is rotated intermittingly, one-quarter turn at a time, by suitable gears 38, one of which, as the driving gear, is mutilated in such manner as, when rotated continuously, to cause the openings 35, of the screen-partitions, to be successively brought into registration with the open side of a receptacle 39, in which is movable a screw conveyer 40, for the purpose of removing the powder into a chute 41, whence it may discharge through a self-closing valve 42, into a receptacle (not shown.)

The mutilated driving gear 38, permits the screen-partitions to remain at rest while one of them, cut off from the desiccating chamber, is discharging into the receptacle 39, and the others, in communication with the desiccating chamber, are permitting the escape of the moisture-laden air, and collecting and retaining the desiccated product.

The powder, which may adhere to the sides of the discharging screen-partition, is removed, partly by agitation, and partly by suction, the agitating means consisting of a beater 43, acting upon the head 36, through the medium of a spring 44, and an operating rod 45, which is actuated by a revolving toothed rack 46, on the main driving shaft, as 47. This toothed rack is mutilated in such manner as to actuate the beater, while the screen-partitions are at rest, and to cease such action immediately before the next quarter-rotation of the dust-collector.

The removal of the powder from the discharging screen-partition is facilitated by a suction-pump 48, having its inlet communicating with the interior of the receptacle 39, and its outlet communicating, through a conduit 49, with the interior of the desiccating chamber, the mouth of the chute 41, being provided with a self-closing valve 42, to prevent neutralization of the suction.

In some instances, the moisture-laden air is returned to the drying chamber 26, whence, its moisture having been reduced, it is again introduced into the desiccating chamber, and for this purpose the dust-collector is inclosed in a suitable casing 50, having an outlet 51, terminating in three branches, 52, 53, and 54, the branch 52, leading to the inlet of the pump 24, while the other branches 53, and 54, communicate with atmosphere. At the junction of these branches, is placed a rotary valve or gate 55, which may be adjusted to open communication between the outlet 51, and the branch 52, cutting off communication between the pump 24, and atmosphere, or such valve may be adjusted to open communication between the outlet 51, and atmosphere, through the branch 53, and to establish similar communication between the branch 52, and the branch 54, said valve being adjustable to any intermediate position to open communication between both the pump, and the interior of the casing 50, and atmosphere.

The pump 23, is connected, through a valved conduit, to the conduit 25, to enable dry heated air from the drying chamber 26, to pass into the pump 23, whence it may be forced through the spraying devices 22, said pump being also connected to the conduit 25, by an auxiliary valved conduit 56, avoiding the heater 27. By adjusting these valves to admix the dry heated air with the dry cool air, air of any desired temperature may be furnished to spraying devices 22, or atmospheric air may be drawn through a supplementary valved conduit 57.

It may be desired to separate from the colloids, the crystalloids of liquids, like buttermilk and whey, which contain milk-sugar and albumen, and to treat either crystalloids or colloids separately; so the pipe 1, is connected to a reservoir 58, which may receive liquid, through valved pipes 59, from one or both compartments of a dialyzing-vat 60, which is also adapted to discharge its dialyzed contents, through valved pipes 61, into reservoir 19, for direct desiccation.

The material in the reservoir 58, may be heated by suitable heating coils 62, adapted to receive a heating agent, as steam, through a valved inlet pipe 63. The supply-pipe leading from the reservoir 58, is also connected by a valved pipe 64, to one of the pipes 61, which is preferably heat insulated.

The temperature of the liquid may be raised in reservoir 58, nearly to the predetermined temperature, and it may then be introduced into the concentrating chamber 2, or, by closing communication with concentrating chamber 2, the heated liquid may be passed at once into reservoir 19, for desiccation, as above set forth.

Upon the introduction of the air into the desiccating chamber, its temperature is considerably reduced by the rapid vaporization of the moisture-content of the spray, so that air of a very high temperature may be introduced to desiccate liquids, the solids of which would be impaired, if heated to such temperature in the original liquid state; as, for example, in the desiccation of milk, air of a temperature of from 300° F. to 400° F. may be used successfully, the air being reduced in temperature by the vaporization of the moisture, to from 140° F. to 200° F., both of these latter temperatures being above the coagulating point of the milk-albumen, but below the temperature at which milk-sugar is caramelized, without impairing in any degree the original chemical or physical structure of the solids.

Air lower in temperature than normal atmospheric air may be introduced into the desiccating chamber, the heating device then serving, without heating said air above normal atmospheric temperature, only to expand it and increase its desiccating power, after it has been cooled and dried in the drying chambers; as, for example, nitrogen-fixing bacteria may be cultivated in sterilized skim milk and this liquid sprayed into and commingled with dried air at a temperature of, for example, 65° F. thereby recovering the bacteria alive and of unimpaired strength mingled with the milk solids.

Liquids containing fats or oils either in natural or emulsified state, in the presence of a suitable substance, as albumen, may be desiccated without causing the oleaginous constituent to be rendered or melted out, owing to the cooling effect produced on the solids; as, for example, the butterfat in cream retains its original globular form when the cream is reduced to dry powder, or castor oil may be emulsified with gum arabic and the liquid reduced to a dry powder, so retaining the oils that the powder is not greasy. The temperature of the air with which the dried powder comes in contact is preferably, but not necessarily, below the melting point of the oleaginous constituent; as for example, milk, containing its full natural butterfat constituent, may be reduced to powder which, when dry, may be exposed to temperatures as high as 212° F. without changing the globular form of its butterfat.

The removal of the moisture and consequent cooling of the solids are accomplished in such instantaneous manner as to prevent self-impairment of the solids owing to the concentration of, for example, active non-volatile constituents; as, for illustration, lactic acid in milk is prevented from combining appreciably with the salts of the milk during the evaporation of the moisture and consequent concentration of the acid.

It will be observed from the foregoing description that by reason of the preliminary removal of a considerable percentage of the moisture of the milk or other substance treated, as by concentration, atoms of the material while in the form of spray contain so small a percentage of moisture that such moisture can be and is instantly taken up by the air or gas in the dry state in which the latter enters the chamber 21. From this it follows that the atoms need be subjected to the action of the heated air or gas only for an exceedingly brief period of time. Owing to the exceedingly short time of such action, and to the fact that the heat of the air or gas is in great measure offset or neutralized by the cooling effect of the rapid evaporation of the moisture, produced by the heated air or gas, it is entirely practicable to use such air or gas at a temperature much higher than could be employed were the substance not first deprived of much of its moisture, treated while in the highly divided state, and promptly removed from the heated air or gas. In other words, the preliminary concentration so far reduces the percentage of liquid constituents that very brief treatment by the heated air or gas will remove substantially all the moisture that remains; the cooling effect of the rapid evaporation will prevent excessive heating of the solid constituents during such treatment though the temperature be such as would effect a chemical change were the treatment of any given atom prolonged; and finally, the solid constituents are removed from the influence of the heat immediately after separation is effected. As a consequence, the resulting product retains all the solid constituents in a normal or natural state, so that the addition of a proper amount of moisture at any subsequent time will restore the substance to precisely its original condition. The dry powder is produced without pasteurization or sterilization, results which would be produced were the solid constituents subjected for any considerable time to a temperature such as is employed in this process.

The percentage of moisture to be removed by the preliminary concentration cannot be stated in precise terms for all substances, nor in fact for any given substance, for the reason that the percentage of liquid or vaporizable and of solid constituents varies more or less in different lots of a given substance. Speaking generally, however, it is found expedient to bring the substance by preliminary treatment to a substantially viscid condition, so that the moisture remaining in any given atom or globule of the spray shall be only such as can be removed during the rapid passage of such atom or particle through the desiccating chamber. As an example, with whole milk of good average quality, it has been found that the best results are attained where it is concentrated to a density of from 14° to 15° Baumé. Fair results are attainable with a preliminary concentration to a density as low as 10° Baumé.

It will be seen from the foregoing explanation that in all cases a large percentage of the moisture or liquid constituents is removed in the preliminary concentration.

Claims

1. The process of obtaining the solid constituents of liquids and semi-liquids, in the form of powder, which process consists in concentrating the substance by removing a large percentage of the water therefrom, converting the concentrated mass into a fine spray, bringing such spray into a current of dry air or gas having an avidity for moisture so that substantially all the remaining liquid constituents are separated thereby, conveying the dry powder into a suitable collecting space away from the air or gas current, and discharging the air or gas separately from the dry powder.

2. The process of obtaining the solid constituents of liquids and semi-liquids, in the form of powder, which process consists in concentrating the substance by removing a large percentage of water therefrom, converting the concentrated mass into a spray, bringing such spray into a current of dry heated air or gas having an avidity for the moisture of the substance treated, retaining the atoms momentarily in said current so that substantially all the remaining moisture is converted into vapor and the product is prevented by the cooling effect of such evaporation from undergoing chemical change, conveying the dry powder into a suitable collecting space away from the vaporizing current, and discharging the air or gas separately from the dry powder.

In witness whereof we have hereunto set our hand this 7th day of August 1906.

LEWIS C. MERRELL.
IRVING S. MERRELL.
WILLIAM B. GERE.

Witnesses:
H. E. CHASE,
HOWARD P. DENISON.